(12) United States Patent
Straeter

(10) Patent No.: US 10,271,473 B2
(45) Date of Patent: Apr. 30, 2019

(54) ROW UNIT DOWNFORCE CONTROL

(71) Applicant: James E. Straeter, Rochester, IN (US)

(72) Inventor: James E. Straeter, Rochester, IN (US)

( * ) Notice: Subject to any disclaimer, the term of this patent is extended or adjusted under 35 U.S.C. 154(b) by 104 days.

(21) Appl. No.: 15/297,756

(22) Filed: Oct. 19, 2016

(65) Prior Publication Data
US 2017/0105336 A1 Apr. 20, 2017

Related U.S. Application Data

(60) Provisional application No. 62/243,345, filed on Oct. 19, 2015.

(51) Int. Cl.
*A01C 7/20* (2006.01)

(52) U.S. Cl.
CPC .................. *A01C 7/205* (2013.01)

(58) Field of Classification Search
CPC .................. A01C 7/205; A01C 7/203
See application file for complete search history.

(56) References Cited

U.S. PATENT DOCUMENTS

| | | | | |
|---|---|---|---|---|
| 4,560,011 A * | 12/1985 | Peterson | ................ | A01B 39/14 172/194 |
| 4,744,316 A * | 5/1988 | Lienemann | ............ | A01C 5/064 111/164 |
| 4,766,962 A * | 8/1988 | Frase | ..................... | A01C 5/064 111/134 |
| 5,163,518 A * | 11/1992 | Foley | ..................... | A01C 7/205 111/62 |
| 5,529,128 A * | 6/1996 | Peterson | ................ | A01B 39/04 172/145 |
| 5,544,709 A * | 8/1996 | Lowe | ..................... | A01B 35/32 172/624.5 |
| 5,555,824 A * | 9/1996 | Stufflebeam | ........... | A01C 7/205 111/61 |
| 6,454,019 B1 * | 9/2002 | Prairie | ................. | A01B 63/145 111/163 |
| 7,025,009 B2 * | 4/2006 | Roibier | ................ | A01B 63/145 111/62 |
| 7,111,566 B2 * | 9/2006 | Horn | ..................... | A01B 63/26 111/62 |
| 7,392,754 B2 * | 7/2008 | Flikkema | ............... | A01C 7/205 111/63 |
| 7,540,333 B2 * | 6/2009 | Bettin | .................... | A01B 63/26 172/397 |
| 8,505,473 B1 * | 8/2013 | Martin | ................... | A01C 7/006 111/164 |
| 8,522,889 B2 | 9/2013 | Adams et al. | | |
| 8,924,092 B2 | 12/2014 | Achen et al. | | |
| 9,686,900 B2 * | 6/2017 | Raetzman | ............ | A01B 61/046 |
| 9,686,901 B2 * | 6/2017 | Achen | .................... | A01B 49/04 |
| 9,814,172 B2 * | 11/2017 | Achen | .................... | A01B 63/32 |
| 2004/0256122 A1 * | 12/2004 | Roibier | ................ | A01B 63/145 172/307 |
| 2012/0168186 A1 * | 7/2012 | Kile | ....................... | A01B 23/02 172/389 |

(Continued)

*Primary Examiner* — Matthew Troutman
(74) *Attorney, Agent, or Firm* — Zarley Law Firm, P.L.C.

(57) ABSTRACT

A row unit downforce control assembly having a six bar linkage pivotally connected to a row unit and a tool bar. Pivotally connected to the six bar linkage is a locator. An actuator is connected to the locator and moves the locator to adjust downward force on the row unit.

8 Claims, 2 Drawing Sheets

(56) References Cited

U.S. PATENT DOCUMENTS

| | | | | |
|---|---|---|---|---|
| 2013/0112121 A1* | 5/2013 | Achen | .................... | A01B 49/04 111/14 |
| 2014/0196919 A1* | 7/2014 | Kowalchuk | .......... | A01B 63/002 172/2 |
| 2015/0073668 A1* | 3/2015 | Achen | .................... | A01B 49/04 701/50 |

* cited by examiner

ROW UNIT DOWNFORCE CONTROL

CROSS REFERENCE TO RELATED APPLICATION

This application claims the benefit of U.S. Provisional Application No. 62/243,345 filed Oct. 19, 2015.

BACKGROUND OF THE INVENTION

This invention relates generally to agricultural equipment and more particularly to downforce adjustment of a row unit.

Row units for planting seed are well-known in the art. Each row unit is mounted to a toolbar of a planter in a manner that allows each row unit to move vertically to adjust to the contour of the soil independently of other row units mounted to the tool bar.

Various devices have been used to create a downforce on the row unit so that the row unit penetrates the soil and minimizes bounce in rough soil conditions. Inadequate downforce can result in shallow seed placement or seed placement on the soil surface. Too much downforce overly compacts the seed bed or forms a deep seed furrow that deters early plant development. Springs and airbags have been used to create downforce, but these systems lack accuracy and predictability. Other systems use expensive and complex hydraulic assemblies to create downforce. The use of downforce control is important as every planter uses some type of downforce mechanism. Further, as planters travel at greater speeds, hydraulic and air systems are slow to react to changes in soil conditions, and are expensive to manufacture. Simple spring systems do not offer the range of force needed to accommodate varying soil conditions. Thus, a need exists in the art for a device that addresses these deficiencies.

An objective of the present invention is to provide a downforce control for a row unit that is more accurate and predictable.

Another objective of the present invention is to provide a downforce control for a row unit having fewer parts that is more economical to manufacture.

A still further objective of the present invention is to provide a downforce control for a row unit that provides a greater range of force to accommodate varying soil conditions.

These and other objectives will be apparent to those skilled in the art based upon the following written description, drawings, and claims.

SUMMARY OF THE INVENTION

A row unit downforce control assembly has a six bar linkage that is pivotally mounted at a first end to a tool bar and at a second end to a row unit. The six bar linkage has a pair of top arms, a pair of middle arms and a pair of bottom arms. Arcuate members are attached to the top arms and the bottom arms.

A locater is pivotally mounted to the pair of middle arms. The locator has vertical outer members with slots at each end. The slots receive rollers that are connected by a biasing member.

An actuator is connected to the locator. The actuator moves the locator to adjust the downward force applied to the row unit.

DETAILED DESCRIPTION OF THE PREFERRED EMBODIMENT

Figure 1:
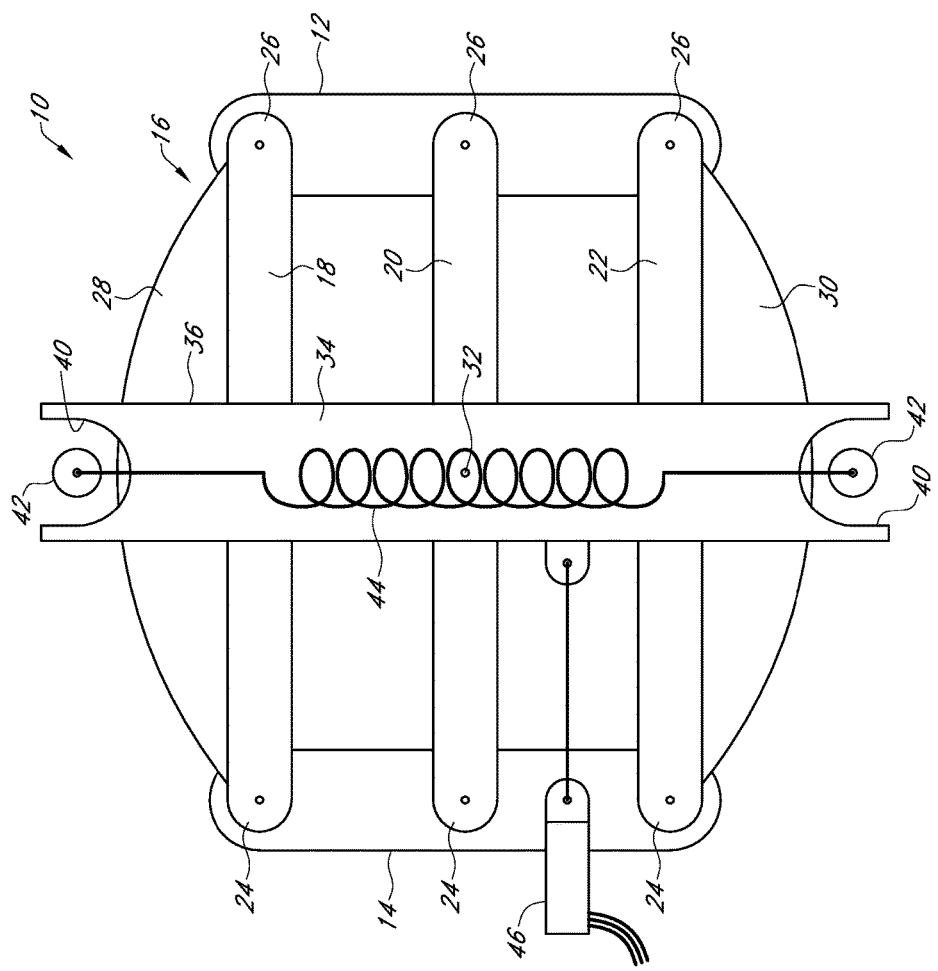
FIG. 1 is a side view of a row unit downforce control assembly.
Figure 2:
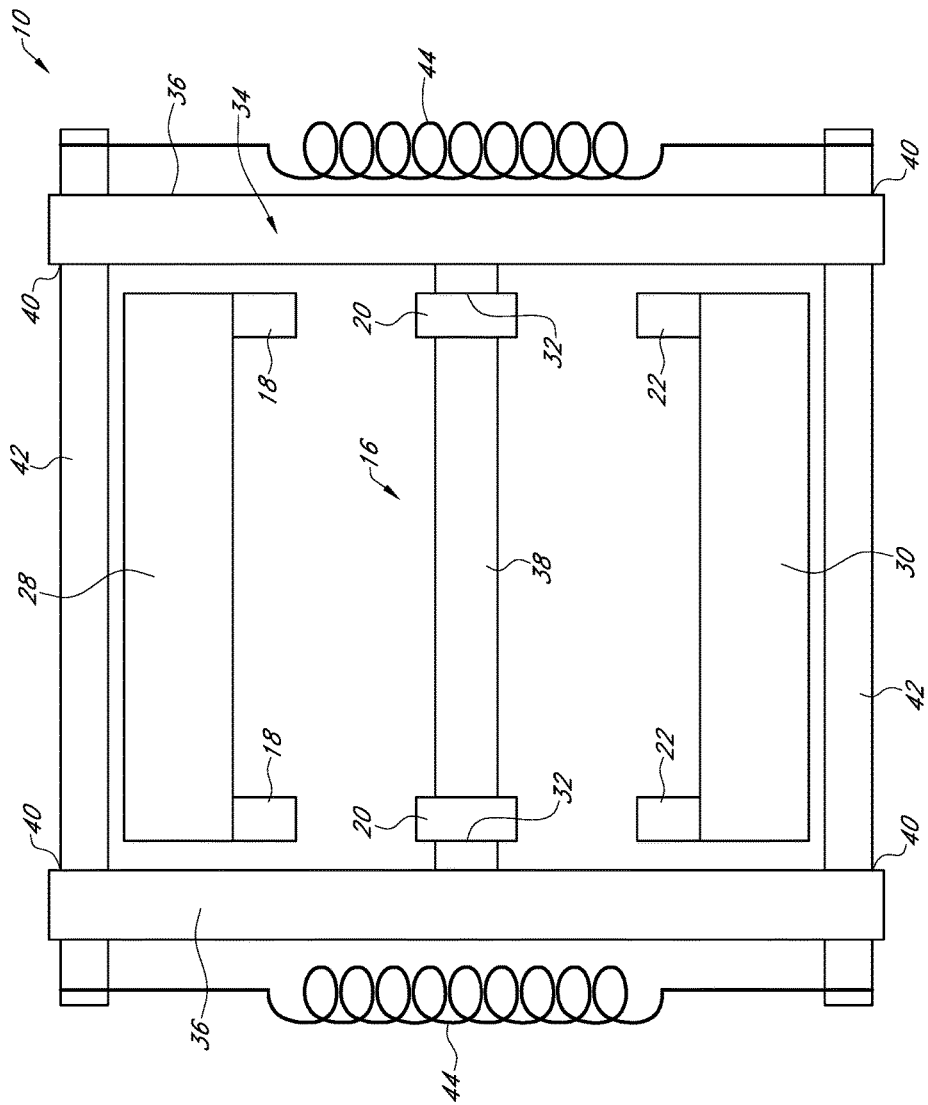
FIG. 2 is an end view of a row unit downforce control assembly.

Referring to the figures, a downforce control assembly 10 connects a row unit 12 to a toolbar 14 of a planter by a six-bar linkage 16. The six-bar linkage 16 includes parallel top arms 18, parallel middle arms 20, and parallel bottom arms 22. A first end 24 of arms 18, 20, and 22 are pivotally connected to the toolbar 14 and a second end 26 of arms 18, 20, and 22 are pivotally connected to the row unit 12.

Added to a top surface of the top arms 18 is an arcuate member 28 that is convex in relation to the top arms 18. Added to the bottom surface of the bottom arms is an arcuate member 30 that is convex in relation to the bottom arms 22.

Pivotally connected to the middle arms 20 at pivot point 32 is a locator 34. Preferably, the locator 34 has an H-frame with generally vertical outer members 36 on a generally horizontal member 38 extending between the outer members 36. At opposite ends of the outer members 36 are slots 40 that preferably are arcuate in shape. The slots 40 receive rollers 42 that engage arcuate members 28 and 30. The rollers 42 are connected by a biasing member 44, such as a spring, a coil, or the like, that extends between the rollers 42. The slots 40 are formed to trap the rollers 42 in the ends of the locator members 36 while allowing the rollers 42 to float up and down within slots 40.

Connected to the locator 34 and the toolbar 14 is an actuating device 46, such as a hydraulic cylinder, electric actuator, or the like. The actuating device is connected to a controller 48 that is either manual or automatic.

In operation, when based on sensed information transmitted to the controller 48 increased downforce on the row unit 12 is needed the actuating device 46 is activated causing the lower end of the locator 34 to pivot toward the toolbar 14 while the top end pivots toward the row unit 12. As the locator 34 pivots, the rollers 42 move along arcuate members 28 and 30. As the rollers 42 move, the biasing member 44 causes downward force to be exerted on the second end 26 of the linkage 16 and upward force is exerted at end 24.

To reduce downforce, the actuating device 46 causes the locator to pivot in the opposite direction causing downward force on end 24 and upward force at end 26 of linkage 16.

Thus, a downforce control assembly has been disclosed that at the very least meets all the stated objectives.

What is claimed is:

1. A row unit downforce control assembly, comprising:
   a linkage pivotally mounted to a tool bar at a first end and a row unit at a second end;
   a locator pivotally connected to the linkage;
   an actuator connected to the locator and configured to move the locator to adjust downward force applied to the row unit;
   the linkage having a pair of top arms and a pair of bottom arms;
   a top arcuate member attached to a top surface of the pair of top arms and a bottom arcuate member attached to a bottom surface of the pair of bottom arms; and
   rollers positioned along the arcuate members such that as the locator pivots, the rollers move along the arcuate members causing a biasing member to vary the downward force applied to the row unit.

2. The assembly of claim 1 wherein the linkage has a pair of middle arms.

3. The assembly of claim 1 wherein the locator is pivotally mounted to a pair of middle arms of the linkage at a pivot point.

4. The assembly of claim 1 wherein the locator has outer vertical members and a horizontal member that extends between the outer vertical members.

5. The assembly of claim 4 wherein opposite ends of the vertical members have slots that receive the rollers.

6. The assembly of claim 5 wherein the rollers are connected by the biasing member extending therebetween.

7. The assembly of claim 5 wherein the slots are formed to trap the rollers while allowing the rollers to float up and down within the slots.

8. The assembly of claim 1 wherein the actuator is connected to a controller.

\* \* \* \* \*